US006383583B1

(12) United States Patent
Ninomiya et al.

(10) Patent No.: US 6,383,583 B1
(45) Date of Patent: May 7, 2002

(54) POLYPROPYLENE EVOH LAMINATE

(75) Inventors: Kenji Ninomiya; Tomoyuki Yamamoto, both of Ibaraki; Motohiro Enokida, Aichi, all of (JP)

(73) Assignees: Nippon Synthetic Chemical Industry Co., Ltd., Osaka; Futamura Chemical Industries Co., Ltd., Nagoya, both of (JP)

(*) Notice: Subject to any disclaimer, the term of this patent is extended or adjusted under 35 U.S.C. 154(b) by 0 days.

(21) Appl. No.: 09/409,220

(22) Filed: Sep. 30, 1999

(30) Foreign Application Priority Data

Jan. 10, 1998 (JP) ............................. 10-279589
Jan. 10, 1998 (JP) ............................. 10-279591

(51) Int. Cl.$^7$ ..................... B32B 27/08; B32B 1/08; B32B 27/30; B32B 27/32
(52) U.S. Cl. ..................... 428/35.4; 156/164; 156/229; 156/244.11; 156/244.22; 156/244.24; 156/244.27; 428/36.6; 428/36.7; 428/215; 428/216; 428/347; 428/349; 428/516; 428/520; 428/910
(58) Field of Search ..................... 156/164, 229, 156/244.11, 244.22, 244.24, 244.27; 428/35.4, 36.6, 36.7, 215, 216, 347, 349, 516, 520, 910

(56) References Cited

U.S. PATENT DOCUMENTS 4,472,485 A 9/1984 Tabuse et al. ............... 428/516
4,561,920 A 12/1985 Foster ..................... 156/244.11
4,880,697 A * 11/1989 Caldwell et al. ............ 428/35.4
4,880,706 A 11/1989 Mazuera et al. ............ 428/516
5,449,552 A 9/1995 Bochow et al. ............. 428/323

FOREIGN PATENT DOCUMENTS

EP          0 561 428       9/1993
EP          0 755 780 A1    1/1997
JP          58033427        2/1983
WO          93/11938        6/1993

* cited by examiner

Primary Examiner—D. S. Nakarani
(74) Attorney, Agent, or Firm—Leydig, Voit & Mayer, Ltd.

(57) ABSTRACT

A laminate having a layer structure of A/C/B/C/D, which is obtained by coextruding a saponified ethylene-vinyl acetate copolymer (B) and an adhesive resin (C) on one side of a polypropylene film (A) oriented at least uniaxially, to give a laminate having a layer structure of A/C/B/C, stretching this laminate in the transverse direction, and laminating a heat sealing layer (D) on a surface of the adhesive resin (C) of the laminate, and a production method thereof. The laminate of the present invention is superior in gas barrier property, moisture proof, aromatic proof and the like under particularly high humidity, and particularly when formed into a packaging bag, the packing bag shows superior sealing performance and appearance. Hence, the laminate of the present invention is useful for various packaging applications and as a packaging bag and the like for food and pharmaceutical preparations.

18 Claims, No Drawings

POLYPROPYLENE EVOH LAMINATE

TECHNICAL FIELD OF THE INVENTION

The present invention relates to a laminate comprising a saponified ethylene-vinyl acetate copolymer (hereinafter also referred to as EVOH) as an intermediate layer. More particularly, the present invention relates to a laminate superior in bag making property in that it affords a packaging bag having excellent gas barrier property, moisture proof, aromatic proof and the like, as well as superior sealing performance and appearance, particularly under high humidity.

BACKGROUND OF THE INVENTION

In general terms, EVOH is superior in transparency, gas barrier property, aromatic proof, solvent resistance, oil resistance and the like, and in view of such superior properties, used for various packaging materials such as food packaging material, pharmaceutical preparation packaging material, industrial chemical packaging material, pesticide packaging material and the like. Moreover, EVOH is expected to replace conventional polyvinylidene chloride coating films (as used herein, a film includes a sheet).

To be specific, the EVOH is a laminate wherein an EVOH layer is laminated via an adhesive layer on the surface of a polyolefin film such as polypropylene (hereinafter to be also referred to as PP) and the like. The film is typically subjected to stretching in an attempt to improve mechanical strength and the like of the laminate.

When such laminate is used as various packaging films, however, the laminate is curled or twisted in response to heat, moisture and the like, due to differences of constituting resins in residual stress and relaxation shrinkage. When the laminate is formed into a packaging bag, the sealed portion thereof suffers from deformation and abnormalities, which may eventually affect the appearance and property of the packaging bag.

To cope with this problem, JP-A-58-33427 teaches absorption of not less than 0.5 wt % of water by a hygroscopic resin layer of the laminated film comprising a polyolefin resin layer and the hygroscopic resin layer (EVOH and the like).

However, according to the above-mentioned method, an EVOH layer (which is a barrier layer) absorbs water, such that the barrier property of the EVOH layer is degraded, failing to sufficiently utilize the barrier property of the EVOH layer, and the productivity of the laminated film is degraded due to the addition of a water absorption step.

U.S. Pat. No. 4,472,485 discloses an oriented film comprised of PP/adhesive resin/EVOH/adhesive resin.

Due to the propensity of EVOH toward lower gas barrier property because of moisture and humidity, however, when the corresponding oriented film is used as various packaging films, the gas barrier property under high humidity may ran out. Further, there is room for improving moisture proof as a packaging bag.

Thus, there is a strong demand for a laminate superior in bag making property and capable of affording a packaging bag excellent in gas barrier property, moisture proof, aromatic proof and the like, as well as sealing performance and appearance, particularly under high humidity.

SUMMARY OF THE INVENTION

It has been now found according to the present invention, that, a laminate obtained by co-extruding EVOH and an adhesive resin on one surface of a polypropylene (PP) film oriented at least uniaxially to give a laminate having a layer structure of PP/adhesive resin/EVOH/adhesive resin, stretching the laminate in the transverse direction (TD) and laminating a heat sealing layer on the surface of the adhesive resin of the laminate, can achieve the above-mentioned goal, particularly when the PP layer has a three-layer structure of polypropylene/hydrocarbon resin-containing polypropylene/polypropylene, and further, when the EVOH layer shows an orientation factor of the C—O group of –0.4 –0.01 as obtained by a polarized infrared dichroism method, and that the action and effect of the present invention can be fully exhibited.

Accordingly, the present invention provides the following.

(1) A laminate having a layer structure of A/C/B/C/D, which is obtained by the steps of
   (a) coextruding a saponified ethylene-vinyl acetate copolymer (B) and an adhesive resin (C) on one side of a polypropylene film (A) oriented at least uniaxially, to give a laminate having a layer structure of A/C/B/C,
   (b) stretching this laminate in the transverse direction, and
   (c) laminating a heat sealing layer (D) on a surface of the adhesive resin (C) of the laminate.

(2) The laminate of (1) above, wherein the A layer has a three-layer structure of A1/A2/A1 wherein A1 is a polypropylene and A2 is a hydrocarbon resin-containing polypropylene.

(3) The laminate of (1) above, wherein the B layer has an orientation factor of a C—O group as determined by a polarized infrared dichroism method of –0.4--0.01.

(4) The laminate of (2) above, wherein the B layer has an orientation factor of a C—O group as determined by a polarized infrared dichroism method of –0.4--0.01.

(5) The laminate of (1) above, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

(6) The laminate of (2) above, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

(7) The laminate of (3) above, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

(8) The laminate of (4) above, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

(9) The laminate of (1) above, further comprising a translucent layer on the A layer, wherein the laminate has a haze value of not less than 30%.

(10) The laminate of (2) above, further comprising a translucent layer on the A layer, wherein the laminate has a haze value of not less than 30%.

(11) The laminate of (3) above, further comprising a translucent layer on the A layer, wherein the laminate has a haze value of not less than 30%.

(12) The laminate of (4) above, further comprising a translucent layer on the A layer, wherein the laminate has a haze value of not less than 30%.

(13) A method for producing a laminate having a layer structure of A/C/B/C/D, comprising the steps of
  (a) coextruding a saponified ethylene-vinyl acetate copolymer (B) and an adhesive resin (C) on one side of a polypropylene film (A) oriented at least uniaxially, to give a laminate having a layer structure of A/C/B/C,
  (b) stretching this laminate in the transverse direction, and
  (c) laminating a heat sealing layer (D) on a surface of the adhesive resin (C) of the laminate.

(14) The production method of (13) above, wherein the polypropylene film (A) has a three-layer structure of A1/A2/A1 wherein A1 is a polypropylene and A2 is a hydrocarbon resin-containing polypropylene.

(15) A packaging bag comprising the laminate of (1) above.

(16) A packaging bag comprising the laminate of (2) above.

(17) A packaging bag comprising the laminate of (9) above.

(18) A packaging bag comprising the laminate of (10) above.

DETAILED DESCRIPTION OF THE INVENTION

The laminate of the present invention is characterized in that it is obtained by co extruding a saponified ethylene-vinyl acetate copolymer (B) and an adhesive resin (C) on one surface of a polypropylene (PP) film (A) oriented at least uniaxially, to give a laminate having a layer structure of A/C/B/C, stretching the laminate in the transverse direction (TD) and laminating a heat sealing layer (D) on a surface of the adhesive resin (C) of the laminate, and that it has a layer structure of A/C/B/C/D.

Preferably, A layer has a three-layer structure of A1/A2/A1 comprising polypropylene (A1) and hydrocarbon resin-containing polypropylene (A2).

Preferably, B layer has an orientation factor of the C—O group of −0.4−−0.01 as determined by a polarized infrared dichroism method.

In the laminate of the present invention, polypropylene (PP) to be used for polypropylene (PP) film (A) oriented at least uniaxially is free of particular limitation and may be homopolypropylene, ethylene-propylene block copolymer, ethylene-propylene random copolymer, a blend of these, and one comprising, in PP, high-density polyethylene, middle-density polyethylene, low-density polyethylene, linear low-density polyethylene, high polymerization degree high-density polyethylene, high polymerization degree low-density polyethylene, unsaturated carboxylic acid modified polyethylene, unsaturated carboxylic acid modified polypropylene and the like, in a proportion of not more than 50%. Preferred is PP having a melt index (MI) (230° C., load 2160 g) of 0.5–20 g/10 min, more preferably, 1–15 g/10 min, particularly preferably 2–7 g/10 min. When MI is smaller than the noted range, the extrusion load undesirably becomes too great and when it is greater than the noted range, PP film (A) undesirably shows lower dimensional stability or mechanical strength.

The above-mentioned PP may contain, where necessary, antistatic agent, anti-fogging agent, ultraviolet light absorber, antioxidant, plasticizer, lubricant, nucleating agent, dispersant, colorant, anti-fungus agent, inorganic filler and the like.

The PP film (A) oriented at least uniaxially can be obtained by forming a sheet from the above-mentioned PP and stretching the sheet by a known method such as uniaxial stretching method, biaxial stretching method (simultaneous or sequential) and the like. The laminate of the present invention is characterized in that a laminate having a structure of A/C/B/C, wherein EVOH (B) and adhesive resin (C) have been co-extruded on PP film (A) oriented at least uniaxially, has been further stretched in the transverse direction (TD). Therefore, this PP film (A) is preferably oriented uniaxially in the machine direction (MD). When it is uniaxially oriented in the direction (MD), the draw ratio is preferably 2–10 (particularly preferably 3–7). When the draw ratio is less than 2, the mechanical strength and moisture proof cannot be improved to a sufficient degree by stretching. Conversely, when the draw ratio exceeds 10, subsequent stretching in the transverse direction (TD) becomes undesirably unstable.

The above-mentioned PP film (A) preferably has a three-layer structure of A1/A2/A1 comprising polypropylene (A1) and hydrocarbon resin-containing polypropylene (A2). By making the PP film (A) a three-layer structure of A1/A2/A1, the laminate affords a packaging bag having excellent gas barrier property, moisture proof, aromatic proof and the like, as well as excellent sealing performance and appearance, particularly under high humidity.

PP to be used for the above-mentioned polypropylene (A1) may be PP used for the above-mentioned PP film (A). The hydrocarbon resin-containing polypropylene (A2) is a blend of PP to be used for the above-mentioned PP film (A) and a predetermined amount of a hydrocarbon resin. The hydrocarbon resin is free of particular limitation and may be an aliphatic hydrocarbon resin made from isoprene and 1,3-pentadiene and the like as the main starting material, an aromatic hydrocarbon resin made from styrene derivative and indene as the main starting material, aliphatic hydrocarbon-aromatic hydrocarbon copolymer resin obtained by copolymerization of these, alicyclic hydrocarbon resin obtained by adding hydrogen to aromatic hydrocarbon resin, synthetic terpene hydrocarbon resin having a structure comprising aliphatic, alicyclic and aromatic hydrocarbon, terpene hydrocarbon resin made from αβ-pinene as a starting material, coumarone-indenehydrocarbon resin made from indene and styrene as a starting material, low molecular weight styrene resin, rozin hydrocarbon resin and the like. Preferred are aromatic hydrocarbon resin, aliphatic hydrocarbon-aromatic hydrocarbon copolymer resin and alicyclic hydrocarbon resin. The hydrocarbon resin content is not particularly limited, but it is preferably 2–40 wt %, more preferably 5–30 wt %, particularly preferably 10–20 wt %, of PP. When the content is less than 2 wt %, gas barrier property and high moisture proof under high humidity are poorly improved, whereas when it exceeds 40 wt %, the resulting film tends to have poor appearance.

The PP film (A) having a three-layer structure of A1/A2/A1 can be obtained by any known method, and it can be obtained by a method comprising coextrusion of PP (A1) and hydrocarbon resin-containing PP (A2) supplied into a 2-kind 3-layer coextrusion film-forming apparatus, a method comprising dry lamination or extrusion lamination of hydrocarbon resin-containing PP (A2) on PP film (A1) and subsequent dry lamination or extrusion lamination of PP (A1) on PP (A2), a method comprising coextrusion lamination of a laminate comprising hydrocarbon resin-containing PP/PP (A2/A1) on PP film (A1) and the like. After forming the three-layer structure laminate, the laminate is stretched in at least uniaxial direction by a known method such as uniaxial stretching, biaxial stretching (simultaneous or sequential) and the like. While the thickness of each layer of the laminate having a three-layer structure of A1/A2/A1 before stretching is not particularly limited, it is preferably A1/A2/A1=10–400/100–2000/10–400 (μm) (particularly 20–200/200–1500/20–200 (μm)) in consideration of subsequent stretching and the like.

While the thickness of the PP film (A) oriented at least uniaxially is not particularly limited, it is preferably not less than 20 μm (particularly 40–500 μm) in consideration of subsequent stretching in the transverse direction (TD).

In the case of a PP film (A) having a three-layer structure of A1/A2/A1, each layer preferably has a thickness of A1/A2/A1=5–100/50–500/5–100 (μm) (particularly 5–50/50–300/5–50 (μm)).

The above-mentioned PP film (A) may undergo a surface treatment as necessary, such as corona discharge treatment, chromic acid treatment, flame treatment, ozone treatment, sand blasting, anchor coating, vacuum deposition and the like.

EVOH (B) to be co-extruded on the above-mentioned PP film (A) is free of particular limitation, wherein the ethylene content is preferably 20–70 mol % (more preferably 25–60 mol %), and the degree of saponification is preferably not less than 80 mol % (more preferably not less than 90 mol %). When the ethylene content is less than 20 mol %, gas barrier property under high humidity and melt forming property are degraded, whereas when it exceeds 70 mol %, sufficient gas barrier property cannot be achieved. Moreover, when the degree of saponification is less than 80 mol %, gas barrier property, heat stability, moisture resistance and the like are undesirably degraded.

The melt index (MI) (210° C., load 2160 g) of this EVOH is preferably 1–50 g/10 min (particularly 2–30 g/10 min). When MI is smaller than the noted range, the inside of the extruder becomes a high torque state during forming to make extrusion unstable. When it is greater than the noted range, the mechanical strength of the formed product becomes undesirably insufficient.

The EVOH can be obtained by saponification of an ethylene-vinyl acetate copolymer. The ethylene-vinyl acetate copolymer can be produced by a known polymerization, such as solution polymerization, suspension polymerization, emulsion polymerization and the like, and saponification of ethylene-vinyl acetate copolymer can be also carried out by a known method.

The EVOH may be modified by copolymerization with a small amount of a different co-monomer such as α-olefin, unsaturated carboxylic acid compound, unsaturated sulfonic acid compound, (meth)acrylonitrile, (meth)acrylamide, vinyl ether, vinylsilane compound, vinyl chloride, styrene and the like. As long as the gist of the present invention is not impaired, EVOH may be post-modified by urethanation, acetalation, cyanoethylation and the like.

EVOH is preferably a blend of at least two kinds, more preferably two kinds, and most preferably at least three kinds, of EVOH to ensure stable stretching and constant film thickness of the molded product obtained. In this case, the EVOHs to be blended preferably have different ethylene content and/or degree of saponification from each other, wherein the difference between the maximum ethylene content and the minimum ethylene content is preferably not less than 4 mol % (more preferably 6–20 mol %, particularly preferably 6–15 mol %). When the difference is less than 4 mol %, the stretchability is improved only to a small degree. The difference between the maximum degree of saponification and the minimum degree of saponification is preferably not less than 1 mol % (more preferably 1.5–10 mol %, particularly preferably 2–5 mol %). When the difference is less than 1 mol %, the stretchability is improved only to a small degree.

EVOH may contain a lubricant such as saturated aliphatic amide (e.g., stearamide and the like), unsaturated fatty acid amide (e.g., oleamide and the like), fatty acid bisamide (e.g., N,N'-ethylenebisstearamide and the like), fatty acid metal salt (e.g., calcium stearate and the like), a low molecular weight polyolefin (e.g., low molecular weight polyethylene having a molecular weight of about 500–10,000, low molecular weight polypropylene and the like) and the like, inorganic salt (e.g., hydrotalcite and the like), plasticizer (e.g., aliphatic polyhydric alcohol such as ethylene glycol, glycerin, hexanediol and the like), ultraviolet light absorber, antioxidant, colorant, anti-fungus agent, slip agent, inorganic filler, other resin such as polyolefin, polyamide and the like, and the like.

While the adhesive resin (C) to be coextruded on PP film (A) with the above-mentioned EVOH (B) is not particularly limited, a polyolefin resin modified with unsaturated carboxylic acid or a derivative thereof is preferably used. The unsaturated carboxylic acid is exemplified by acrylic acid, methacrylic acid, maleic acid, fumaric acid, crotonic acid, itaconic acid, citraconic acid and the like, as well as esters and anhydrides thereof. Examples of such derivative include methyl acrylate, methyl methacrylate, ethyl acrylate, propyl acrylate, butyl acrylate, butyl methacrylate, vinyl acetate, glycidyl acrylate, glycidyl methacrylate, acrylamide, methacrylamide, sodium acrylate and the like. The polyolefin resin is exemplified by polyethylene, polypropylene, polybutene, copolymers thereof, ethylene-vinyl acetate copolymer, ethylene-acrylate copolymer and the like.

The above-mentioned EVOH (B) and adhesive resin (C) are coextrusion laminated on the surface of the PP film (A) to form a C/B/C layer structure on the A surface by a known method. For example, B and C are supplied to a 2-kind 3-layer coextrusion film-forming apparatus to perform coextrusion on the A surface. The melting temperature is generally 170–300° C. (preferably 200–280° C.) for EVOH (B) and 150–300° C. preferably (180–280° C.) for adhesive resin (C).

When a laminate having a C/B/C layer structure on the A surface is formed by coextrusion lamination, each layer of C/B/C has a thickness of 0.4–100 µm (particularly 1–30 µm)/2–400 µm (particularly 4–150 µm)/0.4–100 µm (particularly 1–30 µm). When the thickness of C layer is less than 0.4 µm, coextrusion may become unstable, but when it exceeds 100 µm, the laminate after stretching may have lower transparency and economically disadvantageous. When the B layer has a thickness of less than 2 µm, stretching may result in local thickening or breaking, and when it exceeds 400 µm, the variation in thickness tends to be greater, which is economically disadvantageous.

The laminate obtained as mentioned above, which has a PP/adhesive resin/EVOH/adhesive resin (A/C/B/C) structure, is subsequently stretched in the transverse direction (TD). The stretching can be performed by a known method wherein the draw ratio is preferably 2–20 (particularly 4–15). When the draw ratio is less than 2, the effect of stretching as demonstrated by an improvement in the mechanical strength, gas barrier property and moisture proof becomes insufficient, whereas when it exceeds 20, undesired local thickening and breaking of laminate occur.

The stretched laminate may be subjected to a surface treatment such as corona discharge treatment, chromic acid treatment, flame treatment, ozone treatment, sand blasting, anchor coating, vacuum deposition and the like, as necessary.

The thickness of the whole oriented laminate having an A/C/B/C layer structure is 10–60 µm (particularly 15–40 µm) and each layer preferably has a thickness in the range of not less than 8 µm (particularly 10–50 µm)/0.2–5 µm (particularly 0.3–2 µm)/1–20 µm (particularly 1–10 µm)/0.2–5 µm (particularly 0.3–2 µm). When the thickness of the whole is less than 10 µm, the laminate becomes untenacious and its handling becomes difficult. When it exceeds 60 µm, the laminate tends to have insufficient flexibility. When the A layer has a thickness of less than 8 µm, the moisture proof may become insufficient. When the C layer has a thickness of less than 0.2 µm, the interlaminar adhesion to B layer becomes poor, and when it exceeds 5 µm, the laminate may have lower transparency. When the B layer has a thickness of less than 1 µm, gas barrier property becomes insufficient, and when it exceeds 20 µm, the laminate may have less flexing resistance.

In the above-mentioned laminate, when the A layer has a three-layer structure of PP/hydrocarbon resin-containing PP/PP (A1/A2/A1), each layer of the three-layer structure preferably has a thickness in the range of not less than 0.3 µm (particularly 0.5–5 µm)/3–50 µm (particularly 5–40 µm)/not less than 0.3 µm particularly (0.5–5 µm). When the A1 layer has a thickness of less than 0.3 µm, a hydrocarbon resin may bleed out to cause stickiness or interlaminar adhesion may reduce. When the A2 layer has a thickness of less than 3 µm, gas barrier property and high moisture proof under high humidity may not be improved enough. When it exceeds 50 µm, the laminate may have insufficient flexibility, which is economically disadvantageous.

The present invention is significantly characterized by the laminate having an A/C/B/C/D layer structure obtained by laminating a heat sealing layer (D) on a surface of the C layer of an oriented laminate obtained as mentioned above having a PP/adhesive resin/EVOH/adhesive resin (A/C/B/C) structure. By the presence of the D layer, deformation such as curing, twisting and the like can be prevented. The laminate consequently shows superior sealing performance and superior appearance in addition to superior gas barrier property, moisture proof, aromatic proof and the like, when formed into a packaging bag.

The resin to be used for the heat sealing layer (D) is free of any particular limitation as long as it permits heat sealing. Examples thereof include ethylene polymer, propylene polymer, butene polymer, copolymers thereof, olefin polymer such as copolymer mainly comprising ethylene and one or more co-monomers selected from α-olefin having 3 to 10 carbon atoms, diene having 4 to 15 carbon atoms, vinyl acetate, acrylate, methacrylate and the like, polyester, polyamide, polyacrylonitrile and the like. Of these, preferred are non-oriented polypropylene resin (CPP) and linear low density polyethylene resin (LLDPE), and more preferred is LLDPE polymerized in the presence of a methallocene catalyst.

The resin to be used for the above-mentioned heat sealing layer preferably has a melting point of not more than 150° C. (particularly 70–150° C.). When the melting point exceeds 150° C., PP in the substrate tends to shrink during heat sealing due to a smaller difference in melting point from PP, which may lead to poor appearance when formed into a packaging bag.

While the thickness of the heat sealing layer is not particularly limited, it is preferably not less than 5 µm particularly 10–80 µm) to prevent deformation of the laminate and packaging bag.

The heat sealing layer (D) is laminated on the abovementioned oriented laminate (A/C/B/C) by a known method, such as dry lamination, polysand lamination, extrusion lamination and the like. Inasmuch as the obtained laminate (A/C/B/C/D) has less odor and less dimensional change, dry lamination is preferable.

The laminate of the present invention preferably has an orientation factor of the C—O group of EVOH layer (B), as determined by a polarized infrared dichroism method, of −0.4—−0.01 (particularly −0.3—−0.05). When the orientation factor of the C—O group is less than −0.4, the laminate tends to have lower resistance to tear, and when it exceeds −0.01, the gas barrier property cannot be sufficiently improved by stretching. The orientation factor (F) here obtained by a polarized infrared dichroism method can be determined by the following formula (1):

$$F=(1-D)/(1+2D) \qquad (1)$$

wherein F is orientation factor, D is dichroic ratio, D=At/Am, wherein At and Am are absorbances at absorpton peak (about 1090 $cm^{-1}$) of C—O stretching vibration in the parallel (Am) and perpendicular (At) directions relative to the stretching direction in IR absorption spectrum of the laminate. For the calculation of absorbance, the straight line that connects the valleys near 780 $cm^{-1}$ and 1550 $cm^{-1}$ is determined as a baseline. As used herein, the stretching direction is the direction of stretching of EVOH layer, which corresponds to the transverse direction (TD) of the laminate.

The orientation factor can be adjusted by controlling the composition of EVOH, stretching conditions (stretching temperature, stretching rate, draw ratio) and the like. Above all, the ethylene content of EVOH, which is the main component of the EVOH composition, is set to 20–40 mol %, the degree of saponification is set to not less than 98 mol % and the draw ratio in the transverse direction (TD) is set to not less than 4.

It is also preferable to form a printed layer between the adhesive resin layer (C) and the heat sealing layer (D). The surface to be printed may be formed on either the adhesive resin layer side or heat sealing layer side, and any known printing method (e.g., gravure printing, flexographic printing, screen printing and the like), apparatus and ink can be used.

In addition, a translucent layer may be formed on the surface of the PP layer (A) of the laminate of the present invention to preferably control the haze value of the laminate to not less than 30% (more preferably 40–90%, particularly preferably 50–80%) to afford shading performance and high quality of the packaging bag. When the haze value is less than 30%, the shading performance becomes poor and the high quality characteristic decreases. This translucent layer is subject to no particular limitation as long as the haze value of the laminate falls within the above-mentioned, and can be formed using, for example, a block copolymer of PP—other component, a blend of the aforementioned PP and polyolefin such as LDPE and the like, a special nucleating agent (e.g., quinacridone derivative and the like), inorganic filler, blowing agent and the like, or a film obtained by mechanically embossing the film obtained using PP as mentioned above. Preferred is a blend of an ethylene-propylene block copolymer or ethylene-propylene copolymer and LDPE.

A translucent layer can be formed on the surface of the PP layer (A) by any non-limiting method. Examples thereof include (1) a method comprising laminating on a single layer of PP (A) in advance, (2) a method comprising laminating after forming an (oriented) laminate of PP/adhesive resin/ EVOH/adhesive resin (A/C/B/C), (3) a method comprising laminating after ultimately forming an (oriented) laminate of PP/adhesive resin/EVOH/adhesive resin/heat sealing layer (A/C/B/C/D) and the like. In consideration of productivity, the method (1) is preferable. In this case, for example, PP and a blend of an ethylene-propylene block copolymer or ethylene-propylene copolymer and LDPE and the like are supplied into a 2-kind 2-layer coextrusion film-forming apparatus for coextrusion. The thickness of the translucent layer is not particularly limited. However, it is preferable that the ultimately obtained laminate should have the total thickness of the translucent layer and PP layer (A) of not less than 8 $\mu$m (particularly 10–50 $\mu$m) and the thickness ratio of translucent layer and PP layer (A) of 9/1–1/9, for balancing the shading performance and high quality, and advantages of economy.

The laminate of the present invention is useful for various packaging applications of food and pharmaceutical preparations, such as for moisture proofing packaging, heat sterilization packaging, high temperature filling packaging, pillow type packaging, packaging for use in microwave oven, PTP (press-through pack) packaging, bag in box packaging and the like. Particularly, it is useful as a packaging bag as an alternative film of conventional polyvinylidene chloride coating polypropylene film (KOP). The use in this aspect is explained.

For bag making, a typical bag-making machine can be used. For example, a hot bar seal type or hot roll type bag-making machine can be used to form side seal type, two sided seal type, three sided seal type, butt (or press) seal type bags and the like. An automatic bag-making and filling machine capable of simultaneous bag making and filling by pillow type packaging, three sided seal packaging or four sided seal packaging can be used.

The present invention is hereinafter explained in more detail by referring to Examples. In Examples, "part" means "part by weight" and "%" means "wt %" unless specifically indicated.

Each evaluation method is specifically explained in the following.

Orientation factor of EVOH layer determined by polarized infrared dichroism method Fourier-transform infrared spectrometer, MAGNA760, manufactured by Nicolet, was used to irradiate the infrared rays polarized in the direction parallel to the stretching direction of sample, and the IR absorption spectrum parallel to the stretching direction was determined. Then, the infrared rays polarized in the direction perpendicular to the stretching direction of sample was irradiated, and the IR absorption spectrum perpendicular to the stretching direction was determined. With regard to each absorption spectrum thus obtained, valleys near 780–1550 $cm^{-1}$ were connected with a straight line to give a baseline and the absorbances at the absorption peak due to the stretching vibration of C—O group at 1090 $cm^{-1}$ in the direction parallel and perpendicular to the stretching direction were determined, based on which absorbances dichroic ratio (D) was calculated and the orientation factor (F) was calculated from the above-mentioned formula (1).

Oxygen permeability

Using OXTRAN 10/50 manufactured by MODERN CONTROL Corp., oxygen permeability was measured under the conditions of temperature 20° C., relative humidity 50% or temperature 20° C., relative humidity 80%.

Water vapor transmission rate

According to JIS Z 0208, "Dish Method" of "Testing Methods for Determination of the Water Vapor Transmission Rate of Moisture-Proof Packaging Materials", water vapor transmission rate was measured under the conditions of temperature 40° C., relative humidity 90%.

Haze

Using digital haze meter, NDH-20H, manufactured by NIHON DENSHOKU KOUGYO Co., Ltd., haze was measured at 23° C.

Sealing strength of the fin seal of packaging bag

Using TENSILON UTM-4 100 manufactured by TOYO BALDWIN CO., LTD., the peel strength of a sample cut in 15 mm width was measured at tension speed of 200 mm/min at 23° C.

EXAMPLES 1–5 AND COMPARATIVE EXAMPLE 1

Example 1

Polypropylene [melting point 160° C., density 0.90 g/cm$^3$, MI 3 g/10 min (230° C., load 2160 g), containing amine antistatic agent by 1%] was supplied into a single layer T die extrusion film-forming apparatus (manufactured by Mitsubishi Heavy Industries, Ltd.) and a PP sheet having a thickness of 600 $\mu$m was formed. The sheet was stretched 4 times on a heating roll in the machine direction (MD) to give a 150 $\mu$m thick PP film.

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 70 parts of EVOH, ethylene content 36 mol %, degree of saponification 99.5 mol %, MI 4 g/10 min (210° C., load 2160 g) and 30 parts of EVOH, ethylene content 47 mol %, degree of saponification 96.5 mol %, MI 4.5 g/10 min (210° C., load 2160 g)]/adhesive resin [as mentioned above], in a thickness of 8 $\mu$m/40 $\mu$m/8 $\mu$m at 130 m/min using a 2-kind 3-layer T die coextrusion lamination apparatus (manufactured by Mitsubishi Heavy Industries, Ltd.), and the laminate was stretched 10 times by a tenter method in the transverse direction (TD) at 27 m/min, temperature 150° C. to give an oriented laminate of PP film/adhesive resin/EVOH/adhesive resin (thickness 15 $\mu$m/0.8 $\mu$m/4 $\mu$m/0.8 $\mu$m, EVOH layer having an orientation factor obtained by polarized infrared dichroism method of −0.15).

Onto the surface of the adhesive resin layer of the obtained oriented laminate was applied an adhesive for dry lamination [manufactured by TOYO MORTON CO., LTD., polyester two solvent type] to a solid content of 2 g/m$^2$, and dried to evaporate the solvents. A 20 $\mu$m thick ethylene-butene-propylene copolymer [ethylene content 3%, butene content 2%] non-oriented film was laminated on the applied surface by dry lamination to give a laminate.

The oxygen permeability and water vapor transmission rate of the obtained laminate were measured to be 4.5 cc/m$^2$·atm·day (20° C., 50% RH) and 5.5 cc/m$^2$·day (40° C., 90% RH), respectively, thus showing superior gas barrier property and moisture proof.

A packaging bag (length 20 cm×width 10 cm, three sided sealing with end seal and fin seal, no filling) was produced using an automatic bag-making and filling machine (transverse pillow type packaging machine, FW3400, manufactured by FUJI MACHINERY CO., LTD.) at seal temperature 160° C., number of shot 50 shots/min with the ethylene-butene-propylene copolymer layer of the obtained laminate being a sealing layer.

The packaging bag had a sealing strength of the fin seal of 2000 g/15 mm. Visual observation of the packaging bag showed no abnormalities in the end seal or fin seal and the quality of the bag was fine.

Further, one of the end seal parts of the above-mentioned packaging bag was cut open and para-dichlorobenzene (PDCB, 3 g) was placed therein. The incision was closed by heat sealing and the bag was placed in a 2 L glass container, tightly stoppered and stored at 23° C. After 2 months, the container did not smell PDCB, showing superior aromatic proof of the bag.

Example 2

Polypropylene [melting point 160° C., density 0.90 g/cm$^3$, MI 3 g/10 min (230° C., load 2160 g), containing amine antistatic agent by 1%] was supplied into a single layer T die extrusion film-forming apparatus (manufactured by Mitsubishi Heavy Industries, Ltd.) and a PP sheet having a thickness of 600 $\mu$m was formed. The sheet was stretched 6 times on a heating roll in the machine direction (MD) to give a 100 $\mu$m thick PP film.

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 80 parts of EVOH, ethylene content 34 mol %, degree of saponification 99.5 mol %, MI 8 g/10 min (210° C., load 2160 g) and 20 parts of EVOH, ethylene content 44 mol %, degree of saponification 96.2 mol %, MI 6.5 g/10 min (210° C., load 2160 g)]/adhesive resin [as mentioned above], in a thickness of 7 $\mu$m/21 $\mu$m/7 $\mu$m at 150 m/min using a 2-kind 3-layer T die coextrusion lamination apparatus (manufactured by Mitsubishi Heavy Industries, Ltd.), and the laminate was stretched 7 times by a tenter method in the transverse direction (TD) at 21 m/min, temperature 145° C. to give an oriented laminate of PP film/adhesive resin/EVOH/adhesive resin (thickness 14 $\mu$m/1 $\mu$m/3 $\mu$m/1 $\mu$m, EVOH layer having an orientation factor determined by poled infrared dichroism method of −1.3).

Onto the surface of the adhesive resin layer of the obtained oriented laminate was applied an adhesive for dry lamination [manufactured by TOYO MORTON CO., LTD., polyester two solvent type] to a solid content of 1.5 g/m$^2$, and dried to evaporate the solvents. A 40 $\mu$m thick LLDPE [ethylene-hexene copolymer, hexene content 8%] non-oriented film was laminated on the applied surface by dry lamination to give a laminate.

The oxygen permeability and water vapor transmission rate of the obtained laminate were measured to be 5.2 cc/m$^2$·atm·day (2° C., 50% RH) and 4.5 cc/m$^2$·day (40° C., 90% RH), respectively, thus showing superior gas barrier property and moisture proof.

A packaging bag (length 25 cm×width 5 cm, three sided sealing with end seal and fin seal, no filling) was produced using an automatic bag-making and filling machine (transverse pillow type packaging machine, FW3400, manufactured by FUJI MACHINERY CO., LTD.) at seal temperature 160° C., number of shot 50 shots/min with the LLDPE layer of the obtained laminate being a sealing layer.

The packaging bag had a sealing strength of the fin seal of 4000 g/15 mm. Visual observation of the packaging bag showed no abnormalities in the end seal or fin seal and the quality of the bag was fine.

In the same manner as in Example 1, camphor (3 g) was placed in the packaging bag and incision was closed by heat sealing. The bag was placed in a glass container. After 2 months, the container did not smell camphor, showing superior aromatic proof of the bag.

Example 3

Polypropylene [melting point 160° C., density 0.90 g/cm$^3$, MI 3 g/10 min (230° C., load 2160 g), containing amine antistatic agent by 1%] was supplied into a single layer T die extrusion film-forming apparatus (manufactured by Mitsubishi Heavy Industries, Ltd.) and a PP sheet having a thickness of 800 $\mu$m was formed. The sheet was stretched 5 times on a heating roll in the machine direction (MD) to give a 160 $\mu$m thick PP film.

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 60 parts of EVOH, ethylene content 29 mol %, degree of saponification 99.7 mol %, MI 12 g/10 min (210° C., load 2160 g), 20 parts of EVOH, ethylene content 36 mol %, degree of saponification 99.5 mol %/, MI 8 g/10 min (210° C., load 2160 g), and 20 parts of EVOH, ethylene content 42 mol %, degree of saponification 97.5 mol %, MI 13 g/10 min (210° C., load 2160 g)]/adhesive resin [as mentioned above], in a thickness of 10 $\mu$m/60 $\mu$m/10 $\mu$m at 150 m/min using a 2-kind 3-layer T die coextrusion lamination apparatus (manufactured by Mitsubishi Heavy Industries, Ltd.), and the laminate was stretched 12 times by a tenter method in the transverse direction (TD)

at 38 m/min, temperature 155° C. to give an oriented laminate of PP film/adhesive resin/EVOH/adhesive resin (thickness 13 μm/0.8 μm/5 μm/0.8 μm, EVOH layer having an orientation factor determined by polarized infrared dichroism method of −0.20).

Onto the surface of the adhesive resin layer of the obtained oriented laminate was applied an adhesive for dry lamination [manufactured by TOYO MORTON CO., LTD., polyester two solvent type] to a solid content of 2 g/m$^2$, and dried to evaporate the solvents. A 25 μm thick CPP film [ethylene-butene-propylene copolymer, ethylene content 3.5%, butene content 31 %] was laminated on the applied surface by dry lamination to give a laminate.

The oxygen permeability and water vapor transmission rate of the obtained laminate were measured to be 3.2 cc/m$^2$·atm·day (20° C., 50% RH) and 4.5 cc/m$^2$·day (40° C., 90% RH), respectively, thus showing superior gas barrier property and moisture proof.

A packaging bag (length 25 cm×width 5 cm, three sided sealing with end seal and fin seal, no filing) was produced using an automatic bag-making and filling machine (transverse pillow type packaging machine, FW3400, manufactured by FUJI MACHINERY CO., LTD.) at seal temperature 160° C., number of shot 50 shots/min with the CPP layer of the obtained laminate being a sealing layer.

The packaging bag had a sealing strength of the fin seal of 2700 g/15 mm. Visual observation of the packaging bag showed no abnormalities in the end seal or fin seal and the quality of the bag was fine.

In the same manner as in Example 1, green tea (10 g) was placed in the packaging bag and incision was closed by heat sealing. The bag was placed in a glass container. After 2 months, the container did not smell green tea, showing superior aromatic proof of the bag.

Example 4

In the same manner as in Example 1 except that ethylene-propylene block copolymer [melting point 158° C., density 0.91 g/cm$^3$, MI 6.5 g/10 min (230° C., load 2160 g), ethylene content 25%] and polypropylene [same as in Example 1] were supplied to a 2-kind 2-layer T die coextrusion film-forming apparatus (manufactured by Mitsubishi Heavy Industries, Ltd.) to give a 600 μm thick laminated sheet (thickness 80 μm/520 μm) instead of the single layer PP, an oriented laminate of ethylene-propylene block copolymer resin/PP/adhesive resin/EVOH/adhesive resin (thickness 2 μm/13 μm/0.8 μm/4 μm/0.8 μm, EVOH layer having an orientation factor determined by polarized infrared dichroism method of −0.15) was obtained.

A non-oriented film of ethylene-butene-propylene copolymer was laminated on the obtained laminated in the same manner as in Example 1 to give laminate. The obtained laminate had a haze value of 50%.

This laminate had superior gas barrier property, moisture proof, automatic bag making performance (sealing performance and appearance), automatic proof as in Example 1, and the packaging bag showed superior shading performance and high quality.

Example 5

In the same manner as in Example 2 except that a blend of an ethylene-propylene block copolymer [85%, melting point 158° C., density 0.91 g/cm$^3$, MI 6.5 g/10 min (230° C., load 2160 g), ethylene content 25%] and low density polyethylene [115%, melting point 113° C., density 0.925 g/cm$^3$], and polypropylene [same as in Example 1] were supplied to a 2-kind 2-layer T die coextrusion film-forming apparatus (manufactured by Mitsubishi Heavy Industries, Ltd.) to give a 600 μm thick laminated sheet (thickness 90 μm/510 μm) instead of the single layer PP, an oriented laminate of ethylene-propylene block copolymer resin/PP/adhesive resin/EVOH/adhesive resin (thickness 2 μm/12 μm/1 μm/3 μm/1 μm, EVOH layer having an orientation factor determined by polarized infrared dichroism method of −1.3) was obtained.

In the same manner as in Example 2, oriented film of LLDPE was laminated on the obtained laminate to give a laminate. The obtained laminate had a haze value of 60%.

This laminate superior gas barrier property, moisture proof, automatic bag making performance (sealing performance and appearance), aromatic proof as in Example 2 and the packaging bag showed superior shading performance and high quality.

Comparative Example 1

In the same manner as in Example 1 except that LLDPE was not laminated, a laminate was obtained. The obtained laminate was measured for oxygen permeability and water vapor transmission rate, which were found to be 5.0 cc/m$^2$·atm·day (20° C., 50% RH) and 8.5 cc/m$^2$·day (40° C., 90% RH), respectively.

The obtained laminate was formed in the same manner except that the adhesive resin layers were heat sealed with each other, to give a packaging bag which was subjected to the same evaluation. As a result, a sealing strength of the fin seal was only 200 g/15 mm, and the appearance of the packaging bag was extremely poor in that the laminate was curled during bag making, the fin seal part was wrinkled and the curled laminate was heat sealed as it was.

In the same manner as in Example 1, para-dichlorobenzene (PDCB) was placed in the packaging bag and stored in a glass container. In one week after initiation of the test, PDCB could be smelled in the glass container.

EXAMPLES 6–8 AND COMPARATIVE EXAMPLE 2

Example 6

PP [melting point 160° C., density 0.90 g/cm$^3$, MI 3 g/10 min (230° C., load 2160 g), containing amine antistatic agent 1%] and hydrocarbon resin-containing PP [blend of PP having melting point 160° C., density 0.90 g/cm$^3$, MI 3 g/10 min (230° C., load 2160 g) and an α-methylstyrene-vinyltoluene-indene copolymer in 20%] was supplied to a 2-kind 3-layer T die coextrusion film-forming apparatus (manufactured by Mitsubishi Heavy Industries, Ltd.) and a laminate of PP/hydrocarbon resin-containing PP/PP (thickness 40 μm/720 μm/40 μm) was obtained, which was stretched 4 times on a heating roll in the machine direction (MD) to give a 200 μm thick laminate (thickness 10 μm/180 μm/10 μm).

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 70 parts of EVOH, ethylene content 36 mol %, degree of saponification 99.5 mol %, MI 4 g/10 min (210° C., load 2160 g) and 30 parts of EVOH, ethylene content 47 mol %/, degree of saponification 96.5 mol %, MI 4.5 g/10 min (210° C., load 2160 g)]/adhesive resin [as mentioned above], in a thickness of 8 μm/40 μm/8 m at 130 m/min using a 2-kind 3-layer T die coextrusion lamination apparatus (manufactured by Mitsubishi Heavy Industries, Ltd.), and the laminate was stretched 10 times by a tenter method in the transverse direction (TD) at 27 m/min, temperature 150° C. to give a laminate of PP/hydrocarbon resin-containing PP/PP/adhesive resin/EVOH/adhesive resin (thickness 1 μm/18 μm/1 μm/0.8 μm/4 μm/0.8 μm, EVOH layer having an orientation factor determined by polarized infrared dichroism method of −0.15).

The obtained laminate was measured for oxygen permeability and water vapor transmission rate, which were found to be 9.0 cc/m$^2$·atm·day (20° C., 80% RH) and 3.5 cc/m$^2$·day (40° C., 90% RH), respectively. The obtained laminate showed superior gas barrier property and high moisture proof under high humidity.

This laminate was free of stickiness or adhesion of hydrocarbon resin to the extruder or stretching apparatus.

Onto the surface of the adhesive resin layer of the obtained oriented laminate was applied an adhesive for dry lamination [manufactured by TOYO MORTON CO., LTD., polyester two solvent type] to a solid content of 2 g/m$^2$, and dried to evaporate the solvents. A 20 μm thick ethylene-butene-propylene copolymer [ethylene content 3%, butene content 3%] non-oriented film was laminated on the applied surface by dry lamination to give a laminate.

The obtained laminate was measured for oxygen permeability and water vapor transmission rate, which were found to be 9.0 cc/m$^2$·atm·day (20° C., 80% RH) and 3.1 cc/m$^2$·day (40° C., 90% RH), respectively. The obtained laminate showed superior gas barrier property and high moisture proof under high humidity, like before lamination of ethylene-butene-propylene copolymer.

A packaging bag (length 20 cm×width 10 cm, three sided sealing with end seal and fin seal, no filling) was produced using an automatic bag-making and filling machine (transverse pillow type packaging machine, FW3400, manufactured by FUJI MACHINERY CO., LTD.) at seal temperature 160° C., number of shot 50 shots/min with the ethylene-butene-propylene copolymer layer of the obtained laminate being a sealing layer.

The packaging bag had a sealing strength of the fin seal of 2200 g/15 mm. Visual observation of the packaging bag showed no abnormalities in the end seal or fin seal and the quality of the bag was fine.

Further, one of the end seal parts of the above-mentioned packaging bag was cut open and para-dichlorobenzene (PDCB, 3 g) was placed therein. The incision was closed by heat sealing and the bag was placed in a 2 L glass container, tightly stoppered and stored at 23° C. After 2 months, the container did not smell PDCB, showing superior aromatic proof of the bag.

Example 7

PP [melting point 160° C., density 0.90 g/cm$^3$, MI 3 g/10 min (230° C., load 2160 g), containing amine antistatic agent 1%] and hydrocarbon resin-containing PP [blend of PP having melting point 160° C., density 0.90 g/cm$^3$, MI 3 g/10 min (230° C., load 2160 g) and a β-pinene polymer in 18%] was supplied to a 2-kind 3-layer T die coextrusion film-forming apparatus (manufactured by Mitsubishi Heavy Industries, Ltd.) and a laminate of PP/hydrocarbon resin-containing PP/PP (thickness 85 μm/670 μm/85 μm) was obtained, which was stretched 4 times on a heating roll in the machine direction (MD) to give a 140 μm thick laminate (thickness 15 μm/110 μm/15 μm).

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 80 parts of EVOH, ethylene content 34 mol %, degree of saponification 99.5 mol %, MI 8 g/10 min (210° C., load 2160 g) and 20 parts of EVOH, ethylene content 44 mol %, degree of saponification 96.2 mol %, MI 6.5 g/10 min (210° C., load 2160 g)]/adhesive resin [as mentioned above], in a thickness of 7 μm/21 μm/7 μm at 150 m/min using a 2-kind 3-layer T die coextrusion lamination apparatus (manufactured by Mitsubishi Heavy Industries, Ltd.), and the laminate was stretched 7 times by a tenter method in the transverse direction (TD) at 21 m/min, temperature 145° C. to give a laminate of PP/hydrocarbon resin-containing PP/PP/adhesive resin/EVOH/adhesive resin (thickness 2 m/16 μm/2 μm/1 μm/3 μm/1 μm, EVOH layer having an orientation factor determined by poled infrared dichroism method of −1.3).

The obtained laminate was measured for oxygen permeability and water vapor transmission rate, which were found to be 9.4 cc/m$^2$·atm·day (20° C., 80% RH) and 3.7 cc/m$^2$·day (40° C., 90% RH), respectively. The obtained laminate showed superior gas barrier property and high moisture proof under high humidity.

This laminate was free of stickiness or adhesion of hydrocarbon resin to the extruder or stretching apparatus.

Onto the surface of the adhesive resin layer of the obtained oriented laminate was applied an adhesive for dry lamination [manufactured by TOYO MORTON CO., LTD., polyester two solvent type] to a solid content of 1.5 g/m$^2$, and dried to evaporate the solvents. A 40 μm thick LLDPE [ethylene-octene copolymer, octene content 1%] non-oriented film was laminated on the applied surface by dry lamination to give a laminate.

The obtained laminate was measured for oxygen permeability and water vapor transmission rate, which were found to be 9.2 cc/m$^2$·atm·day (20° C., 80% RH) and 2.9 cc/m$^2$·day (40° C., 90% RH), respectively. The obtained laminate showed superior gas barrier property and high moisture proof under high humidity, like before lamination of LLDPE.

A packaging bag (length 25 cm×width 5 cm, three sided sealing with end seal and fin seal, no filling) was produced using an automatic bag-making and filling machine (transverse pillow type packaging machine, FW3400, manufactured by FUJI MACHINERY CO., LTD.) at seal temperature 160° C., number of shot 50 shots/min with the LLDPE layer of the obtained laminate being a sealing layer.

The packaging bag had a sealing strength of the fin seal of 4500 g/15 mm. Visual observation of the packaging bag showed no abnormalities in the end seal or fin seal and the quality of the bag was fine.

In the same manner as in. Example 6, camphor (3 g) was placed in the packaging bag and incision was closed by heat sealing. The bag was placed in a glass container. After 2 months, the container did not smell camphor, showing superior aromatic proof of the bag.

Example 8

PP [blend of PP having melting point 160° C., density 0.90 g/cm$^3$, MI 3 g/10 min (230° C., load 2160 g), and an amine antistatic agent 1%] and hydrocarbon resin-containing PP [blend of PP having melting point 160° C., density 0.90 g/cm$^3$, MI 3 g/10 min (230° C., load 2160 g) and an α-methylstyrene-vinyltoluene-indene copolymer in 20%] was supplied to a 2-kind 3-layer T die coextrusion film-forming apparatus (manufactured by Mitsubishi Heavy Industries, Ltd.) and a laminate of PP/hydrocarbon resin-containing PP/PP (thickness 120 μm/1200 μm/120 μm) was obtained, which was stretched 5 times on a heating roll in the machine direction (MD) to give a 290 μm thick laminate (thickness 25 m/240 μm/25 μm).

On one side of the obtained PP film was laminated an adhesive resin [modified ethylene-propylene copolymer, density 0.89 g/cm$^3$, MI 4 g/10 min (230° C., load 2160 g), maleic anhydride concentration 0.05%, ethylene content 3 mol %]/EVOH [blend of 60 parts of EVOH, ethylene content 29 mol %, degree of saponification 99.7 mol %, MI 12 g/10 min (210° C., load 2160 g), 20 parts of EVOH, ethylene content 36 mol %, degree of saponification 99.5 mol %, MI 8 g/10 min (210° C., load 2160 g), and 20 parts of EVOH, ethylene content 42 mol %, degree of saponification 97.5 mol %, MI 13 g/10 min (210° C., load 2160 g)]/adhesive resin [as mentioned above], in a thickness of 10 μm/60 μm/10 μm at 150 m/min using a 2-kind 3-layer T die coextrusion lamination apparatus (manufactured by Mitsubishi Heavy Industries, Ltd.), and the laminate was stretched 12 times by a tenter method in the transverse direction (TD) at 38 m/min, temperature 155° C. to give a laminate of PP/hydrocarbon resin-containing PP/PP/adhesive resin/EVOH/adhesive resin (thickness 2 μm/20 μm/2 μm/0.8 μm/5 μm/0.8 μm, EVOH layer having an orientation factor determined by polarized infrared dichroism method of –0.20).

The obtained laminate was measured for oxygen permeability and water vapor transmission rate, which were found to be 6.5 cc/m$^2$·atm·day (20° C., 80% RH) and 3.3 cc/m$^2$·day (40° C., 90% RH), respectively. The obtained laminate showed superior gas barrier property and high moisture proof under high humidity.

This laminate was free of stickiness or adhesion of hydrocarbon resin to the extruder or stretching apparatus.

Onto the surface of the adhesive resin layer of the obtained oriented laminate was applied an adhesive for dry lamination [manufactured by TOYO MORTON CO., LTD., polyester two solvent type] to a solid content of 2 g/m$^2$, and dried to evaporate the solvents. A 25 μm thick CPP film [ethylene-butene-propylene copolymer, ethylene content 3.5%, butene content 3%] was laminated on the applied surface by dry lamination to give a laminate.

The obtained laminate was measured for oxygen permeability and water vapor transmission rate, which were found to be 6.2 cc/m$^2$·atm·day (20° C., 80% RH and 2.5 cc/m$^2$·day (40° C., 90% RH), respectively. The obtained laminate showed superior gas barrier property and high moisture proof under high humidity, like before lamination of CPP film.

A packaging bag (length 25 cm×width 5 cm, three sided sealing with end seal and fin seal, no filling) was produced using an automatic bag-making and filling machine (transverse pillow type packaging machine, FW3400, manufactured by FUJI MACHINERY CO., LTD.) at seal temperature 160° C., number of shot 50 shots/min with the CPP film layer of the obtained laminate being a sealing layer.

The packaging bag had a sealing strength of the fin seal of 3000 g/15 mm. Visual observation of the packaging bag showed no abnormalities in the end seal or fin seal and the quality of the bag was fine.

In the same manner as in Example 6, green tea (10 g) was placed in the packaging bag and incision was closed by heat sealing. The bag was placed in a glass container. After 2 months, the container did not smell green tea, showing superior aromatic proof of the bag.

Comparative Example 2

In the same manner as in Example 6 except that a single PP layer (800 μm thickness) was used instead of the PP/hydrocarbon resin-containing PP/PP laminate, a laminate of PP/adhesive resin/EVOH/adhesive resin (thickness 20 μm/0.8 μm/4 μm/0.8 μm) was obtained. The oxygen permeability and water vapor transmission rate of the obtained laminate were measured and found to be 13.0 cc/m$^2$·atm·day (20° C., 80% RH) and 6.4 cc/m$^2$·day (40° C., 90% RH).

The obtained laminate was formed in the same manner except that the adhesive resin layers were heat sealed with each other, to give a packaging bag which was subjected to the same evaluation. As a result, a sealing strength of the fin seal was only 200 g/15 mm, and the appearance of the packaging bag was extremely poor in that the laminate was curled during bag making, the fin seal part was wrinkled and the curled laminate was heat sealed as it was.

In the same manner as in Example 6, para-dichlorobenzene (PDCB) was placed in the packaging bag and stored in a glass container. In one week after initiation of the test, PDCB could be smelled in the glass container.

The laminate of the present invention is superior in gas barrier property, moisture proof, aromatic proof and the like under particularly high humidity, and particularly when formed into a packaging bag, the packaging bag shows superior sealing performance and appearance. Hence, the laminate of the present invention is useful for various packaging applications and as a packaging bag and the like for food and pharmaceutical preparations.

This application is based on application Nos. 279589/1998 and 279591/1998 filed in Japan, the contents of which are incorporated hereinto by reference.

What is claimed is:

1. A laminate having a layer structure of A/C/B/C/D, which is obtained by the steps of
   (a) coextruding a saponified ethylene-vinyl acetate copolymer (B) and an adhesive resin (C) on one side of a uniaxially oriented polypropylene film (A), to give a laminate having a layer structure of A/C/B/C,
   (b) stretching the laminate having a layer structure A/C/B/C in the transverse direction, wherein the stretched laminate having a layer structure A/C/B/C has a thickness of 10–60 μm, and
   (c) laminating a heat sealing layer (D) on a surface of the adhesive resin (C) of the laminate.

2. The laminate of claim 1, wherein the A layer has a three-layer structure of A1/A2/A1 wherein A1 is a polypropylene and A2 is a hydrocarbon resin-containing polypropylene.

3. The laminate of claim 2, wherein the B layer has an orientation factor of a C—O group as determined by a polarized infrared dichroism method of –0.4 —0.01.

4. The laminate of claim 3, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

5. The laminate of claim 3, further comprising a translucent layer on the A layer, wherein the laminate has a haze value of not less than 30%.

6. The laminate of claim 2, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

7. The laminate of claim 2, further comprising a translucent layer on the A layer, wherein the laminate has a haze value of not less than 30%.

8. A packaging bag comprising the laminate of claim 7.

9. A packaging bag comprising the laminate of claim 2.

10. The laminate of claim 1, wherein the B layer has an orientation factor of a C—O group as determined by a polarized infrared dichroism method of −0.4–0.01.

11. The laminate of claim 10, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

12. The laminate of claim 10, further comprising a translucent layer on the A layer, wherein the laminate has a haze value of not less than 30%.

13. The laminate of claim 1, wherein the B layer comprises at least two kinds of saponified ethylene-vinyl acetate copolymers, a difference between a maximum ethylene content and a minimum ethylene content of the copolymers being not less than 4 mol %, or a difference between a maximum degree of saponification and a minimum degree of saponification of the copolymers being not less than 1 mol %, or a difference between a maximum ethylene content and a minimum ethylene content of the copolymers being not less than 4 mol % and a difference between a maximum degree of saponification and a minimum degree of saponification of the copolymers being not less than 1 mol %.

14. The laminate of claim 1, further comprising a translucent layer on the A layer, wherein the laminate has a haze value of not less than 30%.

15. A packaging bag comprising the laminate of claim 14.

16. A packaging bag comprising the laminate of claim 1.

17. A method for producing a laminate having a layer structure of A/C/B/C/D, comprising the steps of (a) coextruding a saponified ethylene-vinyl acetate copolymer (B) and an adhesive resin (C) on one side of a uniaxially oriented polypropylene film (A), to give a laminate having a layer structure of A/C/B/C, (b) stretching the laminate having a layer structure A/C/B/C in the transverse direction, wherein the stretched laminate having a layer structure A/C/B/C has a thickness of 10–60 $\mu$m, and (c) laminating a heat sealing layer (D) on a surface of the adhesive resin (C) of the laminate.

18. The production method of claim 17, wherein the polypropylene film (A) has a three-layer structure of A1/A2/A1 wherein A1 is a polypropylene and A2 is a hydrocarbon resin-containing polypropylene.

* * * * *

UNITED STATES PATENT AND TRADEMARK OFFICE
CERTIFICATE OF CORRECTION

PATENT NO. : 6,383,583 B1
DATED : May 7, 2002
INVENTOR(S) : Ninomiya et al.

It is certified that error appears in the above-identified patent and that said Letters Patent is hereby corrected as shown below:

Title page,
Item [54], "POLYPROPYLENE EVOH LAMINATE" should read
-- POLYPROPYLENE/EVOH LAMINATE --.

Item [73], Assigness, "Nippon Synthetic Chemical Industry Co., Ltd." should read
-- The Nippon Synthetic Chemical Industry Co., Ltd. --
Item [30], Foreign Application Priority Data,
    "Jan. 10, 1998 (JP)…………..10-279589" should read
    -- Oct. 1, 1998 (JP)…………..10-279589 --.
    "Jan. 10, 1998 (JP)…………..10-279591" should read
    -- Oct. 1, 1998 (JP)…………..10-279591 --.

Column 18,
Line 50, "-0.4 – 0.01." should read -- -0.4 - -0.01. --.

Column 19,
Line 18, "-0.4 – 0.01." should read -- -0.4 - -0.01. --.

Signed and Sealed this

Fifteenth Day of April, 2003

JAMES E. ROGAN
*Director of the United States Patent and Trademark Office*